(12) United States Patent
Rappaport et al.

(10) Patent No.: US 11,200,367 B2
(45) Date of Patent: Dec. 14, 2021

(54) SECURE INTER-FRAME COMMUNICATION

(71) Applicant: Microsoft Technology Licensing, LLC, Redmond, WA (US)

(72) Inventors: Nir Mardiks Rappaport, Bellevue, WA (US); Vikas Malik, Bellevue, WA (US); Itamar Azulay, Mishmar Ayyalon (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/601,159

(22) Filed: Oct. 14, 2019

(65) Prior Publication Data
US 2021/0109992 A1 Apr. 15, 2021

(51) Int. Cl.
*G06F 40/14* (2020.01)
*G06F 8/30* (2018.01)
*H04L 29/06* (2006.01)

(52) U.S. Cl.
CPC .......... *G06F 40/14* (2020.01); *G06F 8/30* (2013.01); *H04L 63/0281* (2013.01)

(58) Field of Classification Search
CPC ......... G06F 40/14; G06F 8/30; H04L 63/0281
See application file for complete search history.

(56) References Cited

U.S. PATENT DOCUMENTS

2014/0229271 A1* 8/2014 Clapp ............... G06Q 30/0245 705/14.44
2014/0281885 A1* 9/2014 Goupil .................. G06F 40/14 715/234
2015/0178819 A1* 6/2015 Kassemi ................ G06Q 20/12 705/26.82
2019/0377766 A1* 12/2019 Bull ........................ G06F 9/445

FOREIGN PATENT DOCUMENTS

EP 3104279 A1 12/2016

OTHER PUBLICATIONS

"International Search Report and Written Opinion Issued in PCT Application No. PCT/US2020/052345", dated Nov. 27, 2020, 12 Pages.
Hsiao, et al., "A Secure Proxy-Based Cross-Domain Communication for Web Mashups", In Proceedings of the Ninth European Conference on Web Services, Sep. 14, 2011, pp. 57-64.
Son, et al., "The Postman Always Rings Twice: Attacking and Defending Post Message in HTML5 Websites", In NDSS Symposium 2013, Feb. 27, 2013, 17 Pages.

* cited by examiner

*Primary Examiner* — Kyle R Stork
(74) *Attorney, Agent, or Firm* — Workman Nydegger

(57) ABSTRACT

Securing inter-frame communication within a web page. First, receipt of a request from a client for accessing a web page document is detected. The request includes a URL that identifies the web page document. The web page document has a tree structure that includes a top parent object and multiple child objects. The multiple child objects include at least a first child object associated with a first domain and a second child object associated with a second domain. The web page document is retrieved from a location corresponding to the URL. The code of the retrieved web page document is then modified to enable secure communication between modified code of the first child object and modified code of the second object. Finally, the modified web page document is sent to the client.

20 Claims, 9 Drawing Sheets

SECURE INTER-FRAME COMMUNICATION

BACKGROUND

A web page is a file or document that may be accessed over a network by a client computing system (hereinafter also referred to as a "client"). A web page may be hosted at a web server (hereinafter also referred to as a "server"). The web server is a computing system that is configured to communicate with one or more clients via a computer network (e.g., the internet, or an intranet). A typical web page is a hypertext document (e.g., an HTML document) which contains text and hyperlinks, and may perhaps refer to scripts, multi-media documents, and so forth.

A web page may be a static web page or a dynamic web page. A static web page is a web page that is delivered to the user's web browser exactly as stored at the web server. Consequently, a static web page displays the same information for all users and in all contexts. In contrast, each time a dynamic web page is reloaded, some variable content may change depending on the context. Consequently, a dynamic web page may display different information to different users.

As an example, a dynamic web page may be generated by a web application. A web application may have client-side portion, and server-side portion. The client-side web application includes client-side logic, which may include execution of script embedded in the HTML. The server-side web application includes server-side logic. The client's web browser runs the client-side logic and/or script to access a web page that is hosted at the server. The server executes the server-side logic to determine how the assembly of newly accessed web page is to proceed.

A loaded web page at the client's browser is often represented by a Document Object Model (DOM). The DOM represents the web page as nodes and objects, such that a scripting language can be used to connect to the web page, and each node or object can be referred to via the scripting language. As such, the scripting language may be used to update or change the DOM to cause the web page to be dynamic. For example, JavaScript and other scripting languages are frequently used to determine the way the received web page is parsed into a DOM. A client's browser can dynamically update or change the DOM based on the script.

At the same time, the server-side logic also includes various parameters that influence how the assembly of every new web page proceeds, including the set up of client-side processing. Accordingly, the dynamically presented information on the web page could come from the server, or from changes made to that page's DOM by the client.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Embodiments disclosed herein are related to securing inter-frame communication within a web page, which may be implemented at a proxy server. First, the proxy server detects receipt of a request from a client for accessing a web page document. The request includes a uniform resource locator (URL) that identifies the web page document. The web page document has a tree structure that includes a top parent object and multiple child objects. The multiple child objects include at least a first child object that is associated with a first domain and a second child object that is associated with a second domain. The first child object may be a first iframe, and the second child object may be a second iframe. The web page document is retrieved from the location corresponding to the URL. The code of the web page document is then modified to enable secure communication between modified code of the first child object and modified code of the second child object. Finally, the modified web page document is sent to the client.

The principles described herein allow a web browser to monitor cross-object (e.g., cross-frame) data requests within the same web page before the potential cross-object communication occurs, analyze the cross-object data requests and block certain cross-object requests. As such, the security risk caused by cross-object communication can be reduced.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
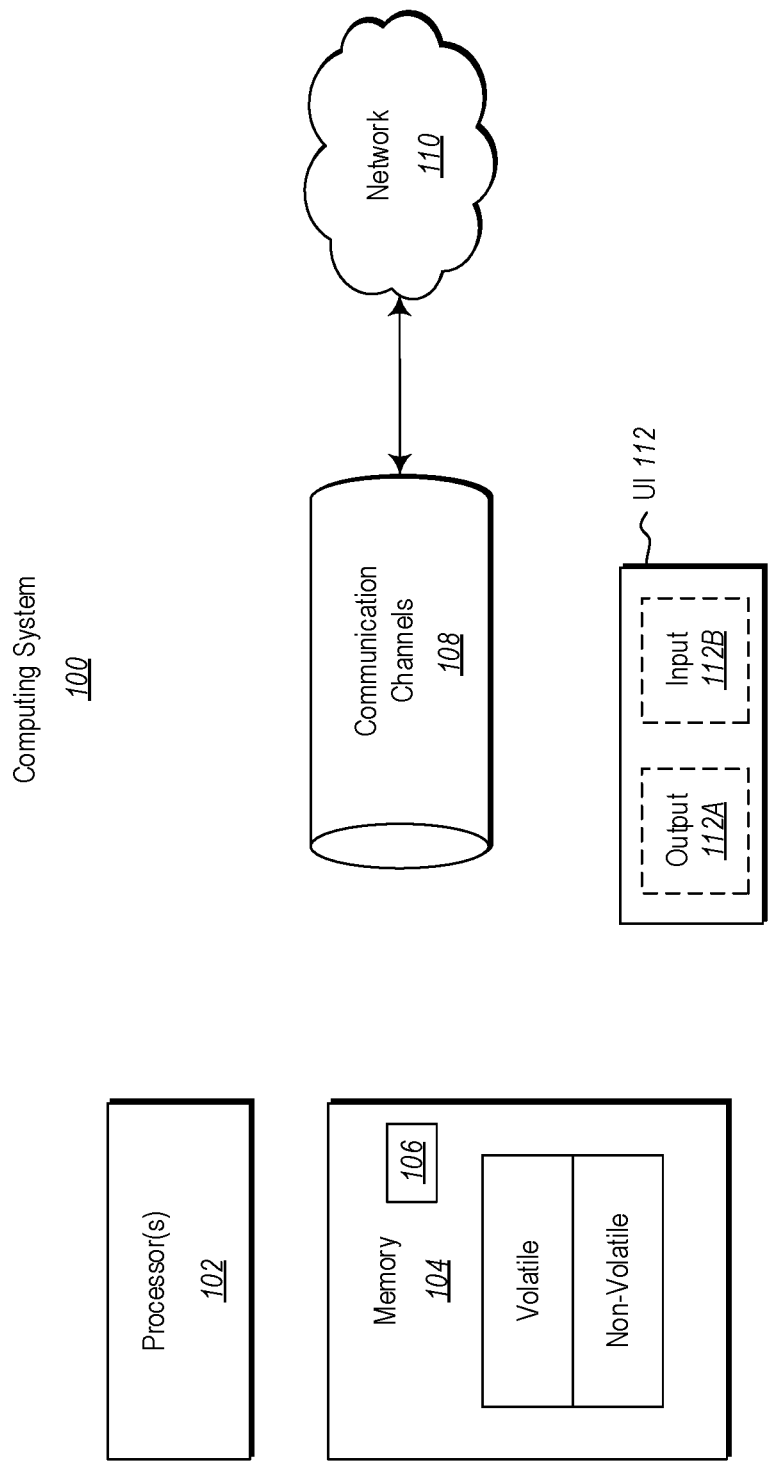
FIG. 1 illustrates an example computing system in which the principles described herein may be employed.

Embodiments disclosed herein are related to securing inter-frame communication within a web page, which may be implemented at a proxy server. First, the proxy server detects receipt of a request from a client for accessing a web page document. The request includes a uniform resource locator (URL) that identifies the web page document. The web page document has a tree structure that includes a top parent object and multiple child objects. The multiple child objects include at least a first child object that is associated with a first domain and a second child object that is associated with a second domain. The first child object may be a first iframe, and the second child object may be a second iframe. The web page document is retrieved from the location corresponding to the URL. The code of the web page document is then modified to enable secure communication between modified code of the first child object and modified code of the second child object. Finally, the modified web page document is sent to the client.

In some embodiments, the modifying the web page document includes adding a script to the web page document. For example, the script may include a wrapper function that wraps one or more functions contained in the web page document, such that a context of each of the one or more functions is isolated from each other.

In some embodiments, the top parent object is caused to determine that cross-object communication request between the first object and the second child object is to be allowed or denied. In response to a determination that the cross-object communication is to be allowed, the top parent object is caused to receive communication from one of the first and second child objects and to pass on the received communication to another one of the first and second child objects. On the other hand, in response to a determination that the cross-object communication is to be blocked, the top parent object is caused to block the cross-object communication.

In some embodiments, the modifying code in the web page document may include adding a secret in each of the first and second child objects. The secret is then used by the top parent object to determine whether to allow the cross-object communication.

The principles described herein allow a browser to monitor cross-object data requests within the same web page before the potential cross-object communication occurs, analyze the cross-origin data requests and block certain cross-object requests based on the one or more security policies maintained at the server. As such, the security risk caused by cross-object communication can be reduced.

For example, when a web application has multiple iframes (hereinafter also referred to as "frames"), and the different frames may include scripts that cause one frame to communicate with another frame. A reverse suffix proxy server may be implemented to intercept such cross-frame communication. For example, the reverse suffix proxy server may have a domain name cas.ms, and the top frame of the web application may have a domain a.com, and two child frames from domains b.com and c.com. A "suffixed application," which is the web application that has been intercepted and modified by the reverse suffix server, would have a top frame pointing at domain a.com.cas.ms, and two child frames from domain b.com.cas.ms and c.com.cas.ms. In other words, each of the frames of the suffixed application would become a suffixed frame that is from a domain name that is suffixed with the domain name of the reverse suffix server. When the frame from domain c.com.cas.ms has to send some data to the frame from domain b.com.cas.ms, the data will be sent to the top frame first, the top frame will then determine whether the cross-frame communication is to be permitted. If the top frames determines to permit the cross-frame communication, the top frame then routes the data from a.com.cas.ms to b.com.cas.ms.

Because the principles described herein may be performed in the context of a computing system, some introductory discussion of a computing system will be described with respect to FIG. 1. Next, the principles of proxy servers will be described with respect to FIGS. 2A-2C. Then, this description will return to the principles of secure inter-frame communication with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general-purpose processor and may also include a field-programmable gate array (FPGA), an application-specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communication connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2A:
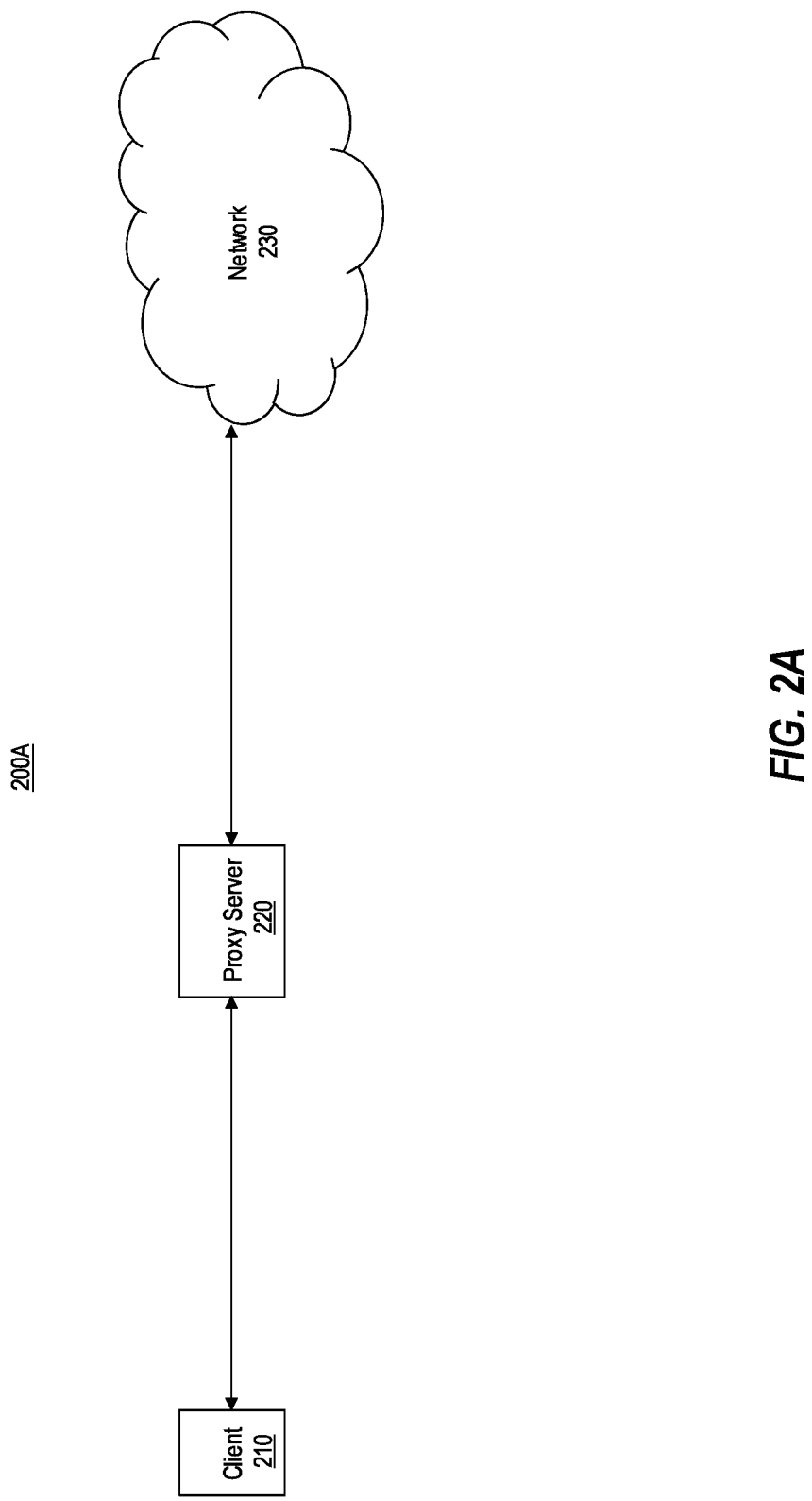
FIG. 2A illustrates an example environment in which a proxy server may be implemented.

Since the principles described herein may be implemented at a proxy server, some introductory discussion about proxy servers will be described now with respect to FIGS. 2A-2C. FIG. 2A illustrates an example environment 200A, in which a proxy server 220 may be implemented. A proxy server may also be called "proxy." A proxy is an intermediary that bridges two routes and/or paths in a cycle or process. For example, the proxy server 220 is used to bridge a client 210 and a computer network 230.

In addition to bridging the gap between two routes or paths, a proxy may also bridge two systems and perform various functions that are central to the process that the two systems are involved in. For example, a forward proxy is a proxy that generally acts on behalf of a client, and a reverse proxy is a proxy that generally acts on behalf of a server. Additional details about forward proxy servers and reverse proxy servers are further discussed below with respect to FIGS. 2B and 2C.

Figure 2B:
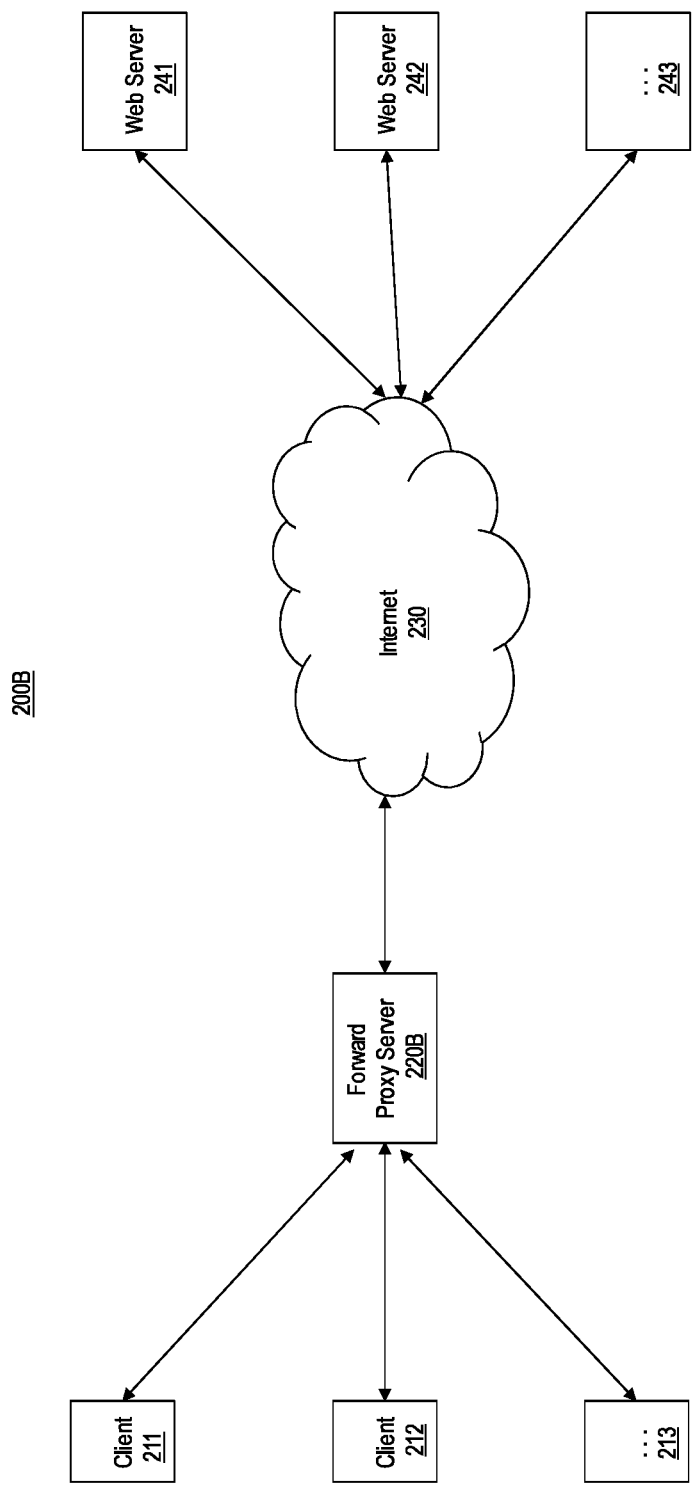
FIG. 2B illustrates an example environment in which a forward proxy server may be implemented.

FIG. 2B illustrates an example environment 200B, in which a forward proxy server 220B is implemented. As illustrated in FIG. 2B, the environment 200B may include multiple clients 211 and 212 and multiple web servers 241 and 242. The ellipsis 213 represents that there may be any number of clients in the environment 200B, and the ellipsis 243 represents that there may be any number of web servers in the environment 200B. Each of the clients 211 and 212 may be structured as described above for the computing system 100 of FIG. 1. Each of the servers 241 and 242 may also be structured as described above for the computing system 100 of FIG. 1.

When a client 211 or 212 is to access one of the web servers 241 and 242, the client 211 or 212 may go through a forward proxy server 220B. This set up may be configured by a user of the client computing system 211 or 212. For example, a user may manually input a forward proxy server's IP address to force the browser to go through the forward proxy server 220B for each inquiry. Alternatively, an organization's IT administrator may set up the forward proxy server 220B within the organization's local network to force all the inquiries initiated through the organization's local network to go through the forward proxy server 220B.

The client 211 or 212 may request access to a web page hosted at one of the web servers 241 and 242. As illustrated in FIG. 2B, the request is not sent directly to the corresponding web server 241 or 242, but sent to the forward proxy server 220B. The forward proxy server 220B then forwards the request to the corresponding web server 241 or 242. After the web server 241 or 242 receives the request from the forward proxy server 220B, the web server 241 or 242 sends the requested web page to the forward proxy server 220B. Once the forward proxy server 220B receives the requested web page, it may determine whether this web page should be passed onto the requesting client 211 or 212.

For example, in the case that the forward proxy server 220B is managed by an administrator at a work environment, the employer may set up the forward proxy server 220B to block users from visiting specific sites, e.g., social networks, explicit sites, etc. The forward proxy server 220B may also be used by the administrator to monitor activities of users, e.g., employees' activities at work. The forward proxy server 220B may log all the employee's activities and detect potential anomalies.

As another example, a forward proxy server may also be used to unblock a site that is blocked or banned by an internet service provider (ISP) or government. For example, a government may prohibit users from accessing certain domains, but the users may use a forward proxy to unblock the domains that are blocked by the government. Further, a user may also use a forward proxy server 220B for masking their IP address to access the web servers 241 and 242.

Figure 2C:
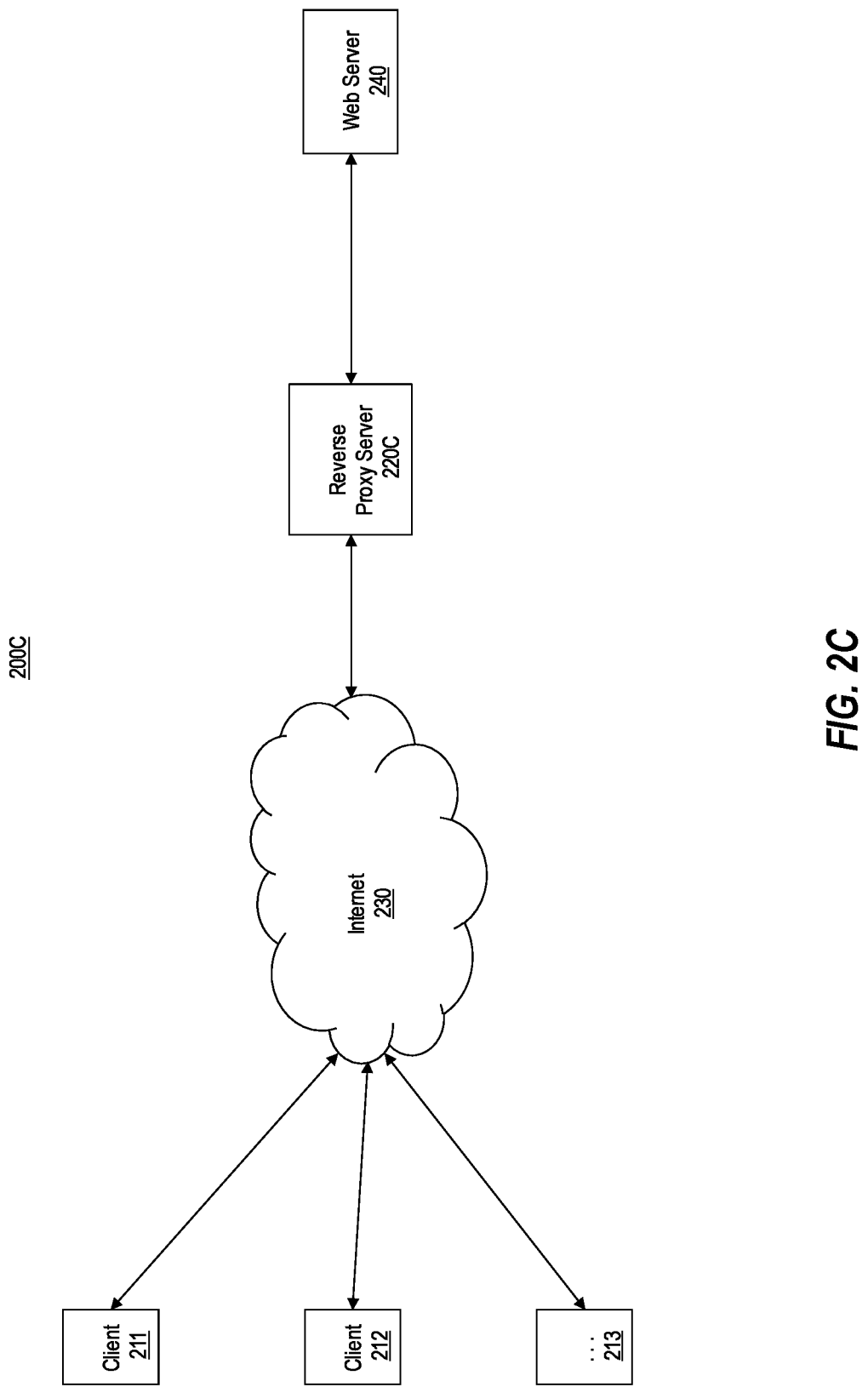
FIG. 2C illustrates an example environment in which a reverse proxy server may be implemented.

FIG. 2C illustrates an example environment 200C, in which a reverse proxy server 220C is implemented. Unlike the forward proxy server 220B, which is generally acting on behalf of a client to communicate with multiple servers, the reverse proxy server 220C is generally acting on behalf of a particular server to communicate with multiple clients 211 and 212. As illustrated in FIG. 2C, there are multiple clients 211 and 212 that are connected to the internet 230. The ellipsis 213 represents that there may be any number of clients in the environment 200C. The reverse proxy server 220C serves as a proxy to a particular web server 240. When each of the clients 211 and 212 requests access to the web server 240, the request is always sent to the reverse proxy server 220C first, and the reverse proxy server 220C may then forward the request to the web server 240.

In some cases, the reverse proxy server 220C may not need to forward the request to the web server 240. For example, the reverse proxy server 220C may act as a security guard that monitors the incoming clients' IP addresses and block certain IP addresses that are listed on a blacklist. As another example, the reverse proxy server 220C may also serve as a cache server that caches the frequently visited web pages, and when a request for a frequently visited web page is received, the reverse proxy server 220C may send a cached web page to the client without having to access the web server 240. When a cashed web page is sent to the client 211 or 212, the reverse proxy server 220C may update the original URL of the web page to the URL of the cached content. For example, the name of the reverse proxy server may be added to the end of the original URL as a suffix. For example, the original URL of the web page requested by the client 211 or 212 may be "abc.com", the reverse proxy server's URL may be "xyz.com", and the reverse proxy 220C may return a different URL to the client. The returned URL may look like "abc.com.xyz.com", which adds the name of the proxy 220C to the end of the original URL. When a proxy server returns a URL that adds its own name to the end of the original URL, such a proxy server may also be called a "suffix proxy."

The reverse proxy server 220C may also be used to achieve various additional functions including (but not limited to) scrub traffic, mask the IP address of the web server, and/or improve site speed through content delivery network (CDN). For example, a CDN may have set up many redundant servers. The reverse proxy server 220C may be configured to forward the client request to one of the redundant servers that is the closest to the client. As another example, the administrator of the web server 240 may use a reverse proxy server 220C to reduce the risk of exposing the web server 240 to intruders.

Further, there is a specific type of proxy server that is called suffix proxy servers or suffix servers. A user may access a page by accessing the suffixing the URL's domain by domain of suffix server which allows the request and response to go through the suffix server. For example, an iframe from domain abc.com is accessed as abc.com.cas.ms where cas.ms is domain of suffix server.

Figure 3:
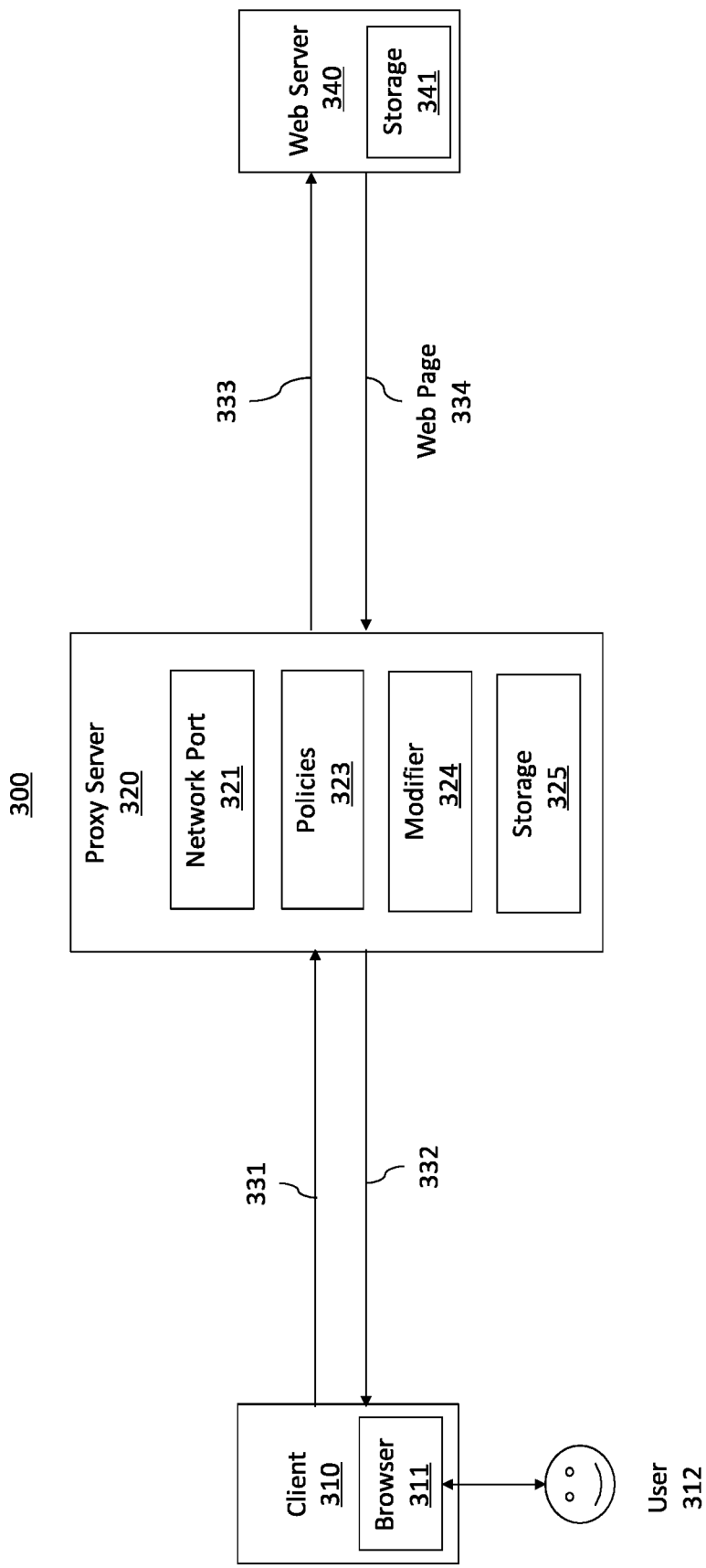
FIG. 3 illustrates an example environment, including a proxy server where the principles described herein may be implemented.
Figure 4:
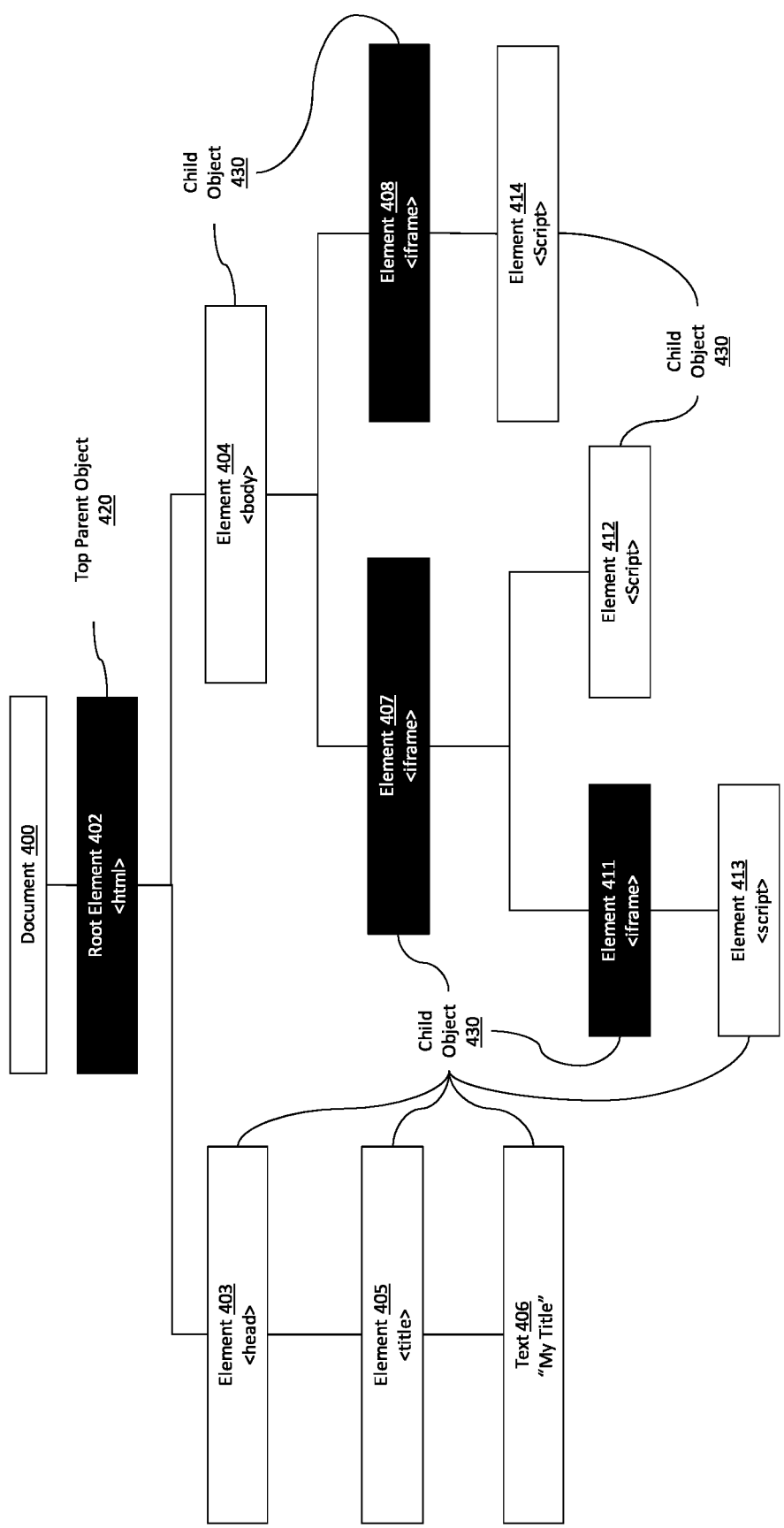
FIG. 4 illustrates an example web page document that is represented by a Document Object Model (DOM)
Figure 5:
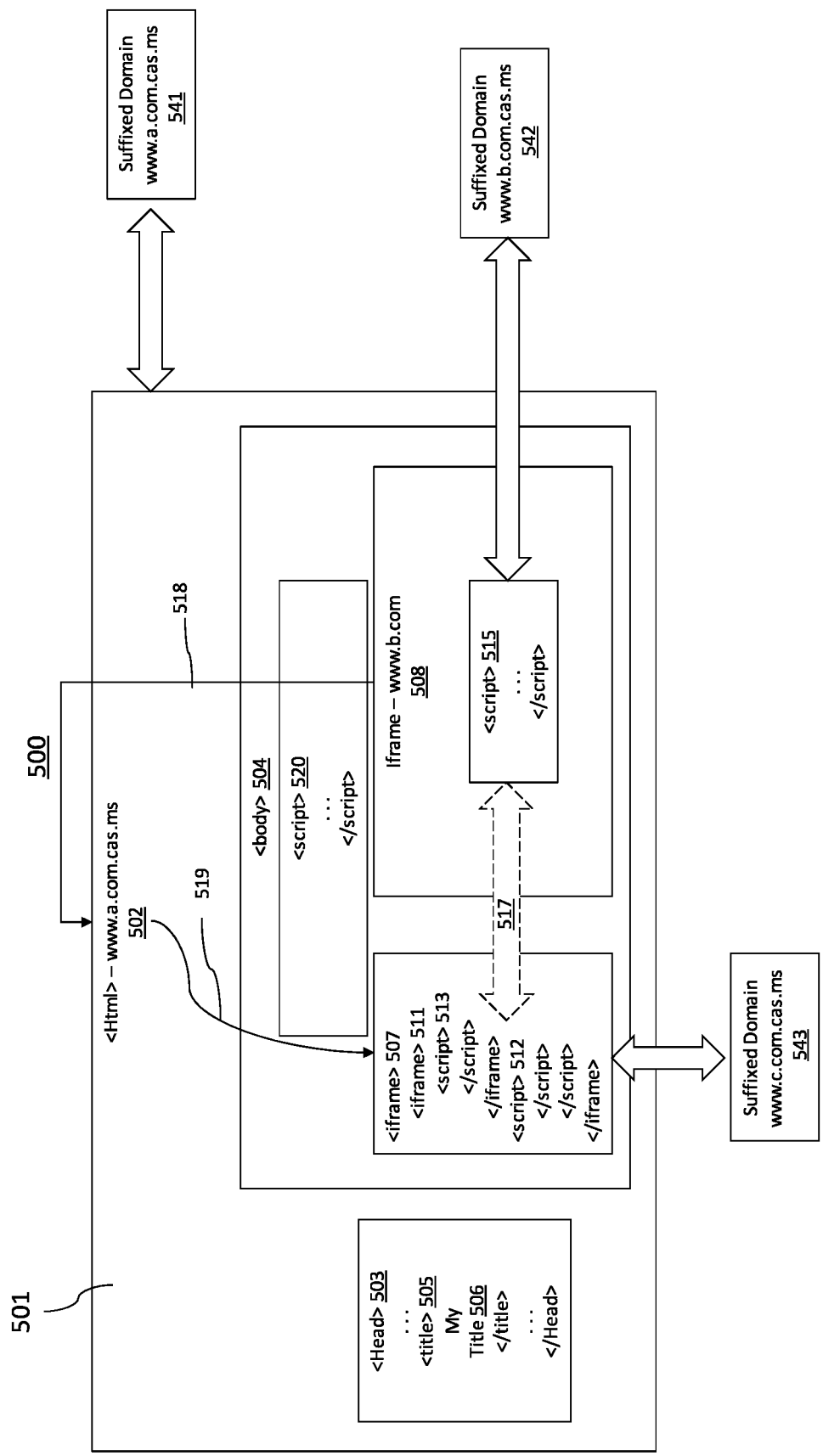
FIG. 5 illustrates an example embodiment of modifying a web page to isolate the context of each iframe contained in a web page document.

After the above introductory discussion about proxy servers, we will now describe how secure inter-frame communication may be achieved by using a proxy server with respect to FIGS. 3-5. FIG. 3 illustrates an example environment 300 including a proxy server 320, in which the method of secure inter-frame communication may be implemented. The proxy server 320 may correspond to a proxy server 220 of FIG. 2A, a forward proxy server 220B of FIG. 2B, and/or a reverse proxy server 200C of FIG. 2C.

Referring to FIG. 3, the environment 300 includes a client 310, a proxy server 320, and a web server 340, each of which may be a computing system 100 of FIG. 1. The proxy server 320 includes a network port 321. The network port 321 may be configured to listen to the incoming communication from the client 310 and/or the web server 340. The network port 321 may also allow the proxy server 320 to send messages and/or data to the client 310 and/or the web server 340.

The client 310 may be used by a user 312. A browser application 311 may be installed at the client 310. The user 312 may open the browser application 311 to browse various web sites. For example, a user 312 (who is using the client 310) may request access to a particular web page by entering a URL in the browser 311. The URL is then sent to the proxy server 320, and the proxy server 320 receives the URL via the network port 321. The communication of sending the URL to the proxy server 320 is represented by the arrow 311. After the proxy server 320 receives the URL from the client 310, the proxy server 320 passes on the request to the server 340, which is represented by arrow 333.

The web server 340 includes a storage 341 that stores one or more web pages. When the web server 340 receives the request from the proxy server 320, it retrieves the web page document (e.g., an Html file) from the storage 341 based on the URL of the web page. The retrieved web page document is then sent to the proxy server 320, which is represented by arrow 334.

After the proxy server 320 receives the web page document, it does not necessarily pass on the web page document to the client 310. Instead, the proxy server 320 may first modify the web page first. As illustrated in FIG. 3, the proxy server 320 includes a modifier 324. In some embodiments, the modifier 324 may change the code contained in the original web page document. In some embodiments, the modifier 324 may add additional scripting language into the original web page document. For example, the web page modifier 324 may add additional scripts, which "wraps" the original web page. "Wrapping" is a programming technique that may be used to isolate script context so that a function contained in the script is limited to its own properties. For example, the proxy server 320 may use a "wrapper" function to isolate at least some of the objects contained in the web page document, so that at least some parameters of the function contained in the objects are wrapped inside a "wrapped" function and are not accessible by another iframe or function contained in another iframe.

The modified web page document may then be sent to the client 310, which is represented by the arrow 332. When the browser 311 at the client 310 receives the modified web page document, the browser 311 may then analyze the modified web page to determine whether cross-origin communication exists between two different iframes and to determine whether the cross-origin communication should be allowed.

Further, the proxy server 320 may have access to one or more security policies 323. For example, the one or more security policies may be stored at the proxy server 320. An IT administrator may determine to implement various security policies, one of which may be to cause the proxy server 320 to modify the web page in a certain manner, such that the web page sent to the client 310 is more secure.

In some embodiments, the proxy server 320 may also include a storage 325 that is configured to store the modified web page documents. The modified web page document stored at the storage 325 may then be referred to by a new URL that is associated with the domain of the proxy server 320. In some embodiments, the proxy server 320 may be a suffix proxy, such that the new URL is represented by suffixing the domain name of the proxy server 320 at the end of the original URL. As briefly described above, for example, the web server 340 may have a domain name "abc.com", and the proxy server 320 may have a domain name "cas.ms." The requested web page may have a URL of "abc.com/abc", and the new URL generated by the suffix proxy server 320 may look similar to"abc.com.cas.ms/abc", because proxy server's suffix URL is appended to domain of requested webpage. The new URL may then be sent to the web browser 311 of the client 310. The browser 311 may then load the modified web page document to display the content of the modified web page.

Additional details about how the modifier 324 may modify a web page document will now be described with respect to FIGS. 4 and 5. To modify a web page contains cross-origin communication or data requests, the structure of the web page document should first be discussed. A web page document often has a tree structure, which may be represented by a document object model (DOM). The modifier 324 may then modify the web page document based on the DOM.

FIG. 4 illustrates an example web page document 400 that is represented by the DOM. The web page document 400 may be an HTML document that includes a root element 420 (i.e., top parent object) and multiple child objects 430, including multiple iframes 407, 408, and 411. The root element 402 is also an iframe, which may also be called a root frame 402. For clarity purposes, each of the iframes is colored in black.

An "iframe" is an inline frame that is specified by the <iframe> tag. An inline frame is used to embed another document within the current HTML document. The current HTML document, i.e., the top parent object is often also an iframe, which may be called a top frame. When the embedded document in one iframe is stored at the same server as that of another iframe, the communication between the two frames is referred to as same-origin inter-frame communication. For example, when the <iframe> element 408 and the top frame 420 are stored at a same domain server, the communication between the iframe 408 and the top frame 420 is same-origin inter-frame communication. The iframes from the same origin generally can communicate with each other freely as long as the communication is within the same origin.

On the other hand, when two iframes include content stored at different servers with different domains, and one iframe requests data from another iframe, the communication between the two iframes is referred to as cross-origin inter-frame communication. For example, when the iframes 408 is stored at b.com and the iframe 407 is stored at c.com, and iframe 408 includes script 414 that requests data from iframe 407, the data request from iframe 408 to iframe 407 is a cross-origin interframe data request. Such communication may create a security risk. Thus, in certain circumstances, it may be advantageous to block certain cross-origin interframe data requests.

The principles described herein enable a suffix server to modify the web page by inserting/modifying code of webpages. It further builds a secure inter-frame communication mechanism between various frames which are suffixed. Secure here implies that data is available to only suffix proxy's inserted/modified code. Such mechanism may enable us to collect relevant configuration and/or debug information in a cross-frame fashion and aggregate it. It also enables creating securely pop up notifications securely for alerting user about various embodiments 500 of inserting and/or modifying code of original web page document by using a suffix proxy server. As illustrated in FIG. 5, the web page document 501 may correspond to the HTML document 400 illustrated in FIG. 4.

The original web page document 501 may be hosted at a first web server that has a domain name of "www.a.com." As briefly described above, the top parent object 502 of the web page document 501 is a top frame 502. Here, the top frame 502 is associated with a domain www.a.com. After the web page document 501 is modified by a suffix server that has a domain name of cas.ms, the updated web page is stored at a new URL www.a.COM.cas.ms at the suffix server. The browser of the client will be redirected to a web page document has a URL www.abc.com.cas.ms 502.

The web page document 501 further includes multiple child iframes 507, 508 and 511. Each of these child iframes 507, 508 and 511 may originally include content from a different domain. For example, child iframe 508 may contain content from a domain named www.b.com, and child iframe 507 may contain content from a domain named www.c.com. After the suffix server, the iframe 508 is now redirected to a URL www.b.vas.ms, and the iframe 507 is now redirected to a URL www.c.cas.ms.

Further, a script element 520 may be added to the web page document 500. The script element 520 may include a "wrapper" function to wrap at least some of the objects contained in each of the iframes 502, 507, 508 and 511, so that at least some parameters of the wrapped iframes are not accessible by another iframe or another function contained in another iframe.

Further, suffix server may insert code in element 520 to cause inter-frame communication requests to be passed onto the top frame 502 first, and have the top frame 502 to determine whether an inter-frame communication request is to be allowed or denied. For example, the iframe 508 may include script 515 that requests data from iframe 507, which is represented by arrow 517. Such a request is sent through the script element 520 that is included in the top frame 502, which is represented by arrow 518. The top frame 502 is then caused to determine whether the inter-frame communication request 517 is to be granted, if the top frame 502 determines that the inter-frame communication request 517 is not to be granted, the request 517 will be blocked. On the other hand, if the top frame 502 determines that the request 517 is to be granted, the request 517 is then passed onto iframe 507 from the top frame 502, which is represented by arrow 519. In one implementation, the suffix server may insert code in all suffix frames to share a secret generated by the suffix server. As an example, a secret may be a randomly generated key that has a fixed length. The randomly generated number may be accessible only within all suffix frames, but not accessible by any other domains or computer systems. Parent frame may make a decision to allow the communication only when the data request from a frame contains the same secret. Alternatively, or in addition, in some implementation, the inserted code in suffixed frames may use the API PostMessage to communicate between other suffixed frames.

Figure 6:
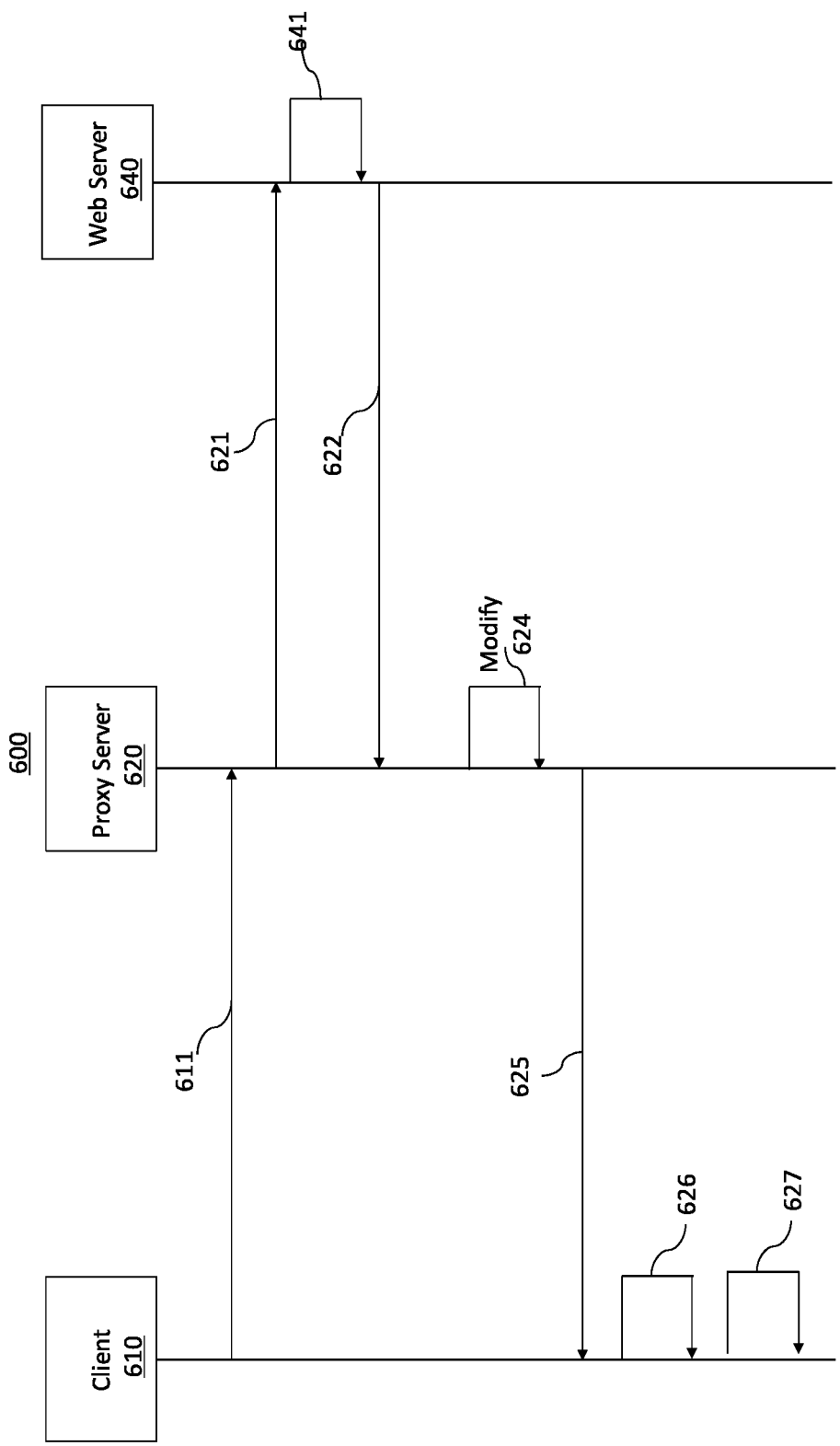
FIG. 6 illustrates a diagram that represents an example communication pattern that may occur amongst a client, a proxy server, and a web server.

FIG. 6 further illustrates a diagram of an example communication pattern 600 that may occur amongst a client 610, a proxy server 620, and a web server 640. The client 510 may correspond to the client 310 of FIG. 3. The proxy server 620 may correspond to the proxy server 320 of FIG. 3. The web server 640 may correspond to the web server 340 of FIG. 3.

As illustrated in FIG. 6, the client 600 first sends a request for accessing a web page document, which may correspond to the web page document 400 of FIG. 4. The request includes a URL that identifies the web page document. The request is intercepted by the proxy server 620, which is represented by arrow 611. In response to detecting the receipt of the request, the proxy server 620 passes on the request for accessing the web page document to the web server 640, which is represented by arrow 621. The request sent to the web server 640 also includes the URL that identifies the web page document. The web server 640 hosts the web page document. Based on the URL contained in the request, the web server 640 retrieves the stored web page document, which is represented by the arrow 641. The storage that stores the web page document may correspond to the storage 342 of FIG. 3. The web server 640 then sends the retrieved web page document to the proxy server 620, which is represented by arrow 622.

After the proxy server 620 receives the web page document, the proxy server 620 may modify the web page document to generate a modified web page document, which is represented by arrow 624. The modification may be performed by the web page modifier 324 of FIG. 3. The modifier 324 may use a "wrapper" function to wrap at least some of the objects contained in the web page document, so that at least some parameters of the wrapped functions are not accessible by another object or another function contained in another object. The proxy server 620 may be a suffix proxy server. In such a case, the suffix proxy server 620 may modify and store the modified web page at a storage associated with its own domain and generate a new URL that suffix the original URL of the webpage with the domain of the suffix proxy server 620.

The modified web page document may then be sent to the client 510, which is represented by arrow 625. After the client 610 receives the web page document, the inserted code by suffix server in top frame may analyze the data communication requests from inserted code across suffixed frames to determine whether communication is to be allowed, which is represented by arrow 626. Finally, based on the determination, if the communication is allowed, data request across suffixed frame may be completed which is represented by arrow 627.

The following discussion now refers to a number of methods and method acts that may be performed. Although the method acts may be disused in a certain order or illustrated in a flow chart as occurring in a particular order, no particular ordering is required unless specifically stated, or required because an act is dependent on another act being completed prior to the act being performed.

Figure 7:
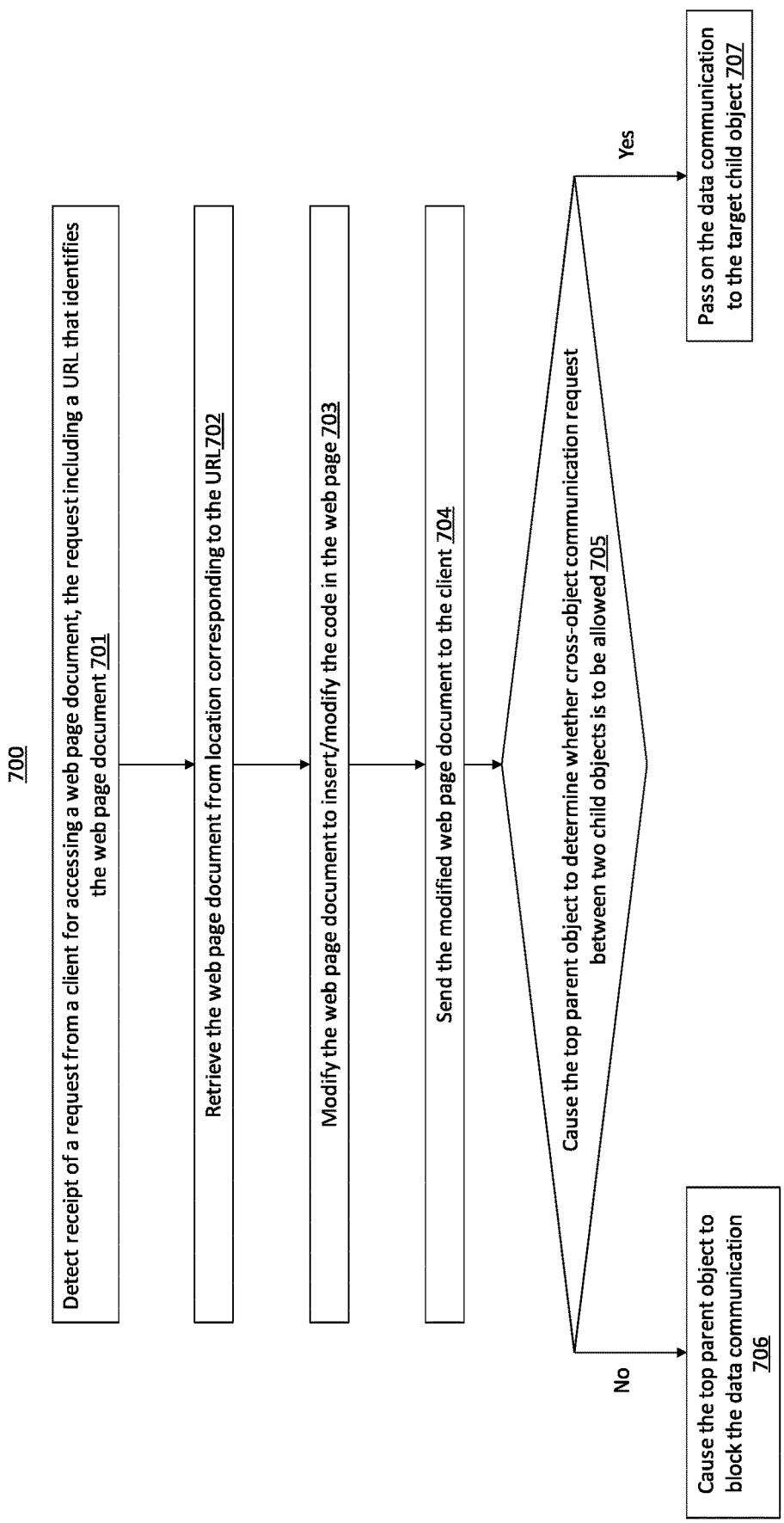
FIG. 7 illustrates a flowchart of an example method for securing inter-frame communication.

FIG. 7 illustrates a flow chart of an example method 700 for securing inter-frame communication. The method 700 may be implemented at a proxy server, which may correspond to the proxy server 320 of FIG. 3. The method 700 includes detecting receipt of a request from a client for accessing a web page document (act 701). The request includes a URL that identifies the web page document. The web page document has a tree structure that includes a top parent object and multiple child objects. The multiple child objects include a first child object associated with a first domain and a second child object associated with a second domain. For example, the first child object may be a first iframe, and the second child object may be a second iframe.

For instance, in FIG. 3, a browser application 311 may be installed at the client 310. The user 312 may enter a URL into the browser application 311 to request access to a web page document. The URL identifies the web page document. The proxy server 320 detects receipt of a request from the client 310 via the network port 321. The request includes the URL entered by the user 312 via the web browser.

The web page document may correspond to the HTML document 400 illustrated in FIG. 4. As illustrated in FIG. 4, the HTML document 400 has a tree structure that includes a top parent object 420 (i.e., the root element 402 tagged by an <html> tag), and multiple child objects 430. At least some child objects 430 are iframes, which have different origins. For example, the top frame 42 may be associated with domain a.com, the child iframe 408 may be associated with domain b.com, and the child iframe 407 may be associated with b.com.

The method 700 further includes retrieving the web page document from a location corresponding to the URL (702). The code of the retrieved web page document is then modified, such that secure communication between modified code of the first child object and modified code of the second child object is enabled (703). For example, the proxy server may be a suffix server, and the modifying code of the retrieved web page may include inserting code in each suffixed frame, such that each suffixed child frames (e.g., the first child object) can communicate securely with other suffixed child frames (e.g., the second child object) by making data communication through top suffixed frame (e.g., the top parent object). In particular, the suffix server may cause the original iframes that are associated with a URL of a different domain to be now associated with a same suffixed URL including the suffix server's domain. For example, the iframe that originally associated with a.com is now associated with a.com.cas.com, the iframe that originally associated with b.com is now associated with b.com.cas.ms.

As another example, illustrated in FIG. 5, the proxy server may add additional scripts 520 into the web page document to generate a modified web page document 500. The script 520 may include a "wrapper" function, which may traverse each of the iframes and to detect script functions contained in each of the iframes, and wrap each of the detected script functions. As such, any parameters in any script functions are isolated; thus, all the potential cross-frame data request in suffixed frames may be secured. In particular, cross-frame or cross-object communication is not necessarily prohibited, but made secure by modifying cross-frame communication of data to suffix proxy's code.

Next, the modified web page document is sent to the client 704. When the client 704 (e.g., a web browser 311 of the client 310) receives the modified web page document, the web browser 311 may cause the top parent object to determine whether communication between two of the child objects (e.g., two iframes) is to be allowed (act 705). In response to the determination that cross-origin communication exists, the top parent object may be caused to determine whether the cross-origin communication request is to be allowed. When the top parent object determines that the cross-origin communication request is not allowed, the request is blocked by the top parent object (act 706). When the top parent object determines that the cross-origin communication request is allowed, the request is passed on from the request child object to the target child object (act 707). In one implementation, the suffix server may insert code in all suffix frames to share a secret generated by the suffix server. Parent frame may make a decision to allow the communication only when the data request from a frame contains the same secret. In some implementation, the inserted code in suffixed frames may use the API PostMessage to communicate between other suffixed frames.

For example, as illustrated in FIG. 5, the iframe 508 may include script 515 that requests data from the iframe 507. The request is intercepted and sent to the top parent frame 502 first. The top parent frame 502 receives the request and determines whether the request is to be allowed. If the request is not allowed, the request will be blocked by the top parent frame 502. In case the request is allowed, the request will be passed on to the iframe 507 from the parent frame 502.

The principles described herein enable collecting and aggregating relevant information in an inter-frame or inter-object fashion and provide a secure and manageable inter-frame communication mechanism. Users' experience using web applications or viewing web pages are generally not affected, and only when certain conditions happen in an application and/or web page's frame or object, the user may be notified.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed is:

1. A computing system comprising:
   at least one processor; and
   at least one computer-readable hardware storage device having stored thereon computer-executable instructions that are structured such that, when executed by the at least one processor, the computer-executable instructions configure the computing system to at least:
      detect receipt of a request from a client for accessing a web page document, the request including a uniform resource locator (URL) that identifies the web page document, the web page document having a tree structure that includes a top parent object and a plurality of child objects, the plurality of child objects including at least a first child object associated with a first domain and a second child object associated with a second domain;
      retrieve the web page document from the location corresponding to the URL;
      based on at least one security policy, modify code in the web page document to enable certain communication between modified code of the first child object and modified code of the second child object, the modification of the code in the web page document causing a request for an inter-frame communication between the first child object and the second child object to be passed onto the top parent object, and causing the top parent object to determine whether the inter-frame communication request is to be allowed;
      send the modified web page document to the client, causing the modified web page document to be displayed at the client; and
      in response to the determination of allowing the inter-frame communication by the top parent object, cause the inter-frame communication to be performed at the client when the modified web page document is displayed at the client.

2. The computing system of claim 1, the modifying code in the web page document comprising:
   adding a script to the web page document.

3. The computing system of claim 2, wherein the script includes a wrapper function that wraps at least one function contained in the web page document, such that a context of each of the at least one function is isolated from each other.

4. The computing system of claim 1, the modifying code in the web page document comprising:
   adding a secret in each of the first and second child objects, the secret being used by the top parent object to determine whether to allow the inter-frame communication.

5. The computing system of claim 1, wherein the first child object is a first iframe, and the second child object is a second iframe.

6. The computing system of claim 5, the modifying the web page document comprising:
   adding scripting code to the web page document, the script including a wrapping function that wraps at least one function contained in the first iframe or the second iframe, such that a context of each of the first and second iframes is isolated from each other.

7. The computing system of claim 5, the computing system further configured to:
   cause the top parent object to determine that one of the first and second iframes is configured to request data from another of the first and second child iframes.

8. The computing system of claim 5, the modifying the web page document comprising:
   storing content associated with at least one of the first and second iframes at a storage location that associated with the computing system, the at least one of the first and second iframes being associated with a second URL; and
   modifying the second URL that is associated with the at least one of the first and second iframes to a third URL that is associated with the storage location.

9. The computing system of claim 8, wherein the third URL is a suffix URL that suffixes a domain associated with the computing system to the second URL.

10. The computing system of claim 1, wherein:
    the URL is a first URL, and
    the computing system further configured to:
    store the modified web page document at a location accessible by selection of a second URL that is different than the first URL; and
    send the second URL to the client.

11. The computing system of claim 10, wherein:
    the second URL has a domain name that is different than the domain name of the first URL.

12. The computing system of claim 11, wherein:
    the second URL is a suffix URL that suffixes a domain name that is associated with the computing system to the first URL.

13. A computer-implemented method for securing inter-frame communication within a web page, the method comprising:
    detecting receipt of a request from a client for accessing a web page document, the request including a uniform resource locator (URL) that identifies the web page document, the web page document having a tree structure that includes a top parent object and a plurality of child objects, the plurality of child objects including at least a first child object associated with a first domain and a second child object associated with a second domain;
    retrieving the web page document from the location corresponding to the URL;
    based on at least one security policy, modifying the web page document to enable certain communication between modified code of the first child object and modified code of the second child object, the modification of the code in the web page document causing a request for an inter-frame communication between the first child object and the second child object to be passed onto the top parent object, and causing the top parent object to determine whether the inter-frame communication request is to be allowed;
    sending the modified web page document to the client, causing the modified web page document to be displayed at the client; and in response to the determination of allowing the inter-frame communication by the top parent object, causing the inter-frame communication to be performed at the client when the modified web page document is displayed at the client.

14. The method of claim 13, the method further comprising:
adding scripting code to the web page document.

15. The method of claim 14, wherein the scripting code includes a wrapper function that wraps at least one function contained in the web page document, such that a context of each of the at least one function is isolated from each other.

16. A computer program product comprising at least one computer-readable hardware storage devices having stored thereon computer-executable instructions that are structured such that, when executed by one or more processors of a computing system, the computer-executable instructions cause the computing system to at least:
detect receipt of a request from a client for accessing a web page document, the request including a uniform resource locator (URL) that identifies the web page document, the web page document having a tree structure that includes a top parent object and a plurality of child objects, the plurality of child objects including at least a first child object associated with a first domain and a second child object associated with a second domain;
retrieve the web page document from the location corresponding to the URL;
based on at least one security policy, modify the web page document to enable secure communication between modified code of the first child object and modified code of the second child object, the modification of the code in the web page document causing a request for an inter-frame communication between the first child object and the second child object to be passed onto the top parent object, and causing the top parent object to determine whether the inter-frame communication request is to be allowed;
send the modified web page document to the client, causing the modified web page document to be displayed at the client; and
in response to the determination of allowing the inter-frame communication by the top parent object, cause the inter-frame communication to be performed at the client when the modified web page document is displayed at the client.

17. The method of claim 13, wherein the modifying of code in the web page document comprises adding a secret in each of the first and second child objects, the secret being used by the top parent object to determine whether to allow the inter-frame communication.

18. The method of claim 13, wherein the first child object is a first iframe, and the second child object is a second iframe.

19. The method of claim 18, the modifying of the web page document comprising:
adding scripting code to the web page document, the script including a wrapping function that wraps at least one function contained in the first iframe or the second iframe, such that a context of each of the first and second iframes is isolated from each other.

20. The method of claim 18, he method further comprising:
causing the top parent object to determine that one of the first and second iframes is configured to request data from another of the first and second child iframes.

* * * * *